United States Patent [19]
Oda

[11] Patent Number: 5,675,389
[45] Date of Patent: Oct. 7, 1997

[54] TELEVISION RECEIVER APPARATUS AND METHOD FOR SELECTIVELY DISPLAYING CHARACTER INFORMATION IN A PLURALITY OF DISPLAY MODES

[75] Inventor: Osamu Oda, Tokyo, Japan

[73] Assignee: Sony Corporation, Tokyo, Japan

[21] Appl. No.: 483,341

[22] Filed: Jun. 7, 1995

[30] Foreign Application Priority Data

Jun. 7, 1994 [JP] Japan .................... 6-124124

[51] Int. Cl.$^6$ .................................................. H04N 5/445
[52] U.S. Cl. .................. 348/468; 348/564; 348/556
[58] Field of Search ........................ 348/468, 556, 348/564, 558; H04N 5/445

[56] References Cited

U.S. PATENT DOCUMENTS

| | | |
|---|---|---|
| 4,673,984 | 6/1987 | Kikuchi et al. . |
| 4,679,091 | 7/1987 | Kikuchi et al. . |
| 5,453,794 | 9/1995 | Ezaki ........................ 348/468 |
| 5,467,142 | 11/1995 | Ichinokawa ................ 348/556 |

*Primary Examiner*—Victor R. Kostak
*Attorney, Agent, or Firm*—Charles M. Fish, Esq.; Lise A. Rode, Esq.; Jerry A. Miller

[57] ABSTRACT

A television receiver such as a high definition television (HDTV) receiver and method for receiving a character broadcasting signal, wherein the number of scanning lines used to display character information contained in the character broadcasting signal is varied so as to fully display this character information on a television screen. The television receiver for displaying the character information includes a character broadcasting decoder for decoding a character broadcasting signal; a display for displaying a picture in response to a television signal on which the character broadcasting signal has been superimposed; a video signal amplifier circuit for changing the number of scanning lines used to display the picture on the display means; and data storage RAM for moving the scanning line position where character information by the character broadcasting signal is to be displayed based upon the number of the scanning lines changed by the video signal amplifier circuit. The user may control whether the character information is displayed on the display through the use of key unit or remote control.

23 Claims, 4 Drawing Sheets

SCANNING LINE NUMBER

SUPERIMPOSED WORD

340 LINES

SUPERIMPOSED WORD

SUPERIMPOSED WORD

SUPERIMPOSED WORD

TELEVISION RECEIVER APPARATUS AND METHOD FOR SELECTIVELY DISPLAYING CHARACTER INFORMATION IN A PLURALITY OF DISPLAY MODES

BACKGROUND OF THE INVENTION

1. Field of the Invention

The present invention relates to a television receiver which includes a character broadcasting (teletext) decoder for decoding a character broadcasting signal, and also to a method of displaying character information included in the character broadcasting signal.

2. Description of the Related Art

Very recently, there have been strong demands to provide new attractive aspects in televisions that give the effect and feeling of being at a live performance. This has traditionally been achieved through a combination of large screen size and high picture quality.

In conventional TV receivers, a so-called "wide screen image" has been made (namely, no picture signals in the upper and lower portions of a screen) in order to achieve the effects of a high quality picture and live performance attendance. An alternative method of achieving this effect is through high definition television (HDTV) pictures in which longer, lateral-sizes (wide) pictures have been broadcasted. Under such circumstances, such a longer lateral-sized wide picture could be used as the main TV picture in the near future in TV receivers by converting a high definition TV picture into the standard TV picture.

Currently, the technical specifications of high definition television include among other things: 1125 scanning lines, an aspect ratio defined to be 16:9 (horizontal:vertical directions), and interlacing selected to be 2:1. As a consequence, this high definition television system has no compatibility with a conventional television system whose scanning line number is 525 and whose aspect ratio is 4:3. Even in light of the high quality picture produced in HDTV, it is unlikely that the current standard television system will be completely substituted by such a high definition television system, but that both of these TV systems will be independently available. Therefore, even in HDTV receivers, standard TV pictures must necessarily be displayed, and such compatible type high definition television receivers capable of displaying the standard TV pictures have been developed.

In the above-described compatible-type high definition television receiver, since the aspect ratio of the picture display unit is 16:9, when the standard TV picture with the aspect ratio of 4:3 is displayed, blank portions occur at the right and left sides of the screen (see FIG. 4A). On the other hand, when a longer lateral-sized wide picture such as a movie picture is displayed on the standard television receiver, blank portions occur at the upper and lower sides of the screen (see FIG. 4B). Problems occur in the case where characters such as a superimposed words are displayed at the lower blank position.

For example, when the movie picture as shown in FIG. 4B is displayed on the high definition television receiver, in such a manner that this movie picture is displayed on the entire screen of the picture display unit to gain maximum visual effect, there is the problem that the superimposed characters would be "dropped out" where they should be originally displayed; for example, the lower blank position of a conventional TV.

Thus, to solve this problem, various types of conventional television receivers have been proposed which extract the characters, (e.g., superimposed words) from the picture signal and store then in picture memory. The stored characters are then superimposed on the movie image, thereby preventing the above-described character dropout.

Various other broadcasting systems such as satellite TV broadcasting and character TV broadcasting are being used in addition to the above-explained high definition television broadcasting.

As to the character TV broadcasting system, the character signal is superimposed as character information during the vertical flyback period of the video signal, which is different from the above-described standard TV signal. That is, the character signal is superimposed as a digital signal in the vertical flyback period, which is different from the video signal. In order to effect such a character broadcasting program, a specially designed decoder for the character broadcasting signal is necessarily required. As a result, various types of standard TV signal receivers as well as high definition TV signal receivers, equipped with such a character broadcasting decoder have been developed.

Character broadcasting systems have been proposed such that characters are displayed on an entire screen, and a superimposed word having supplemental information about the displayed picture is also displayed this screen. For example, weather forecasting services and movie information (superimposed) services are currently available.

However, when the standard TV receiver equipped with the character broadcasting program decoder is used to accept various services of the character broadcasting system, e.g., a superimposed word service of movie on the longer lateral-sized wide screen, this superimposed word is displayed on a fixed screen position, e.g., the lower blank position. Under these circumstances, when a movie picture is displayed on the overall screen, the superimposed word supplied by the character broadcasting system would be dropped out from this screen.

Additionally, in the case of the high definition TV signal receiver equipped with the character broadcasting program decoder, where the entire screen is used to display a picture, there is a problem that the superimposed character of the character broadcasting system will also be dropped out.

Thus, superimposed word dropouts cannot be avoided in the above-described conventional method for extracting these superimposed words.

The present invention has been made to solve the above-explained problem, and therefore, has as an objective to provide a television receiver and a character information display method thereof, capable of accepting superimposed characters without being adversely influenced by the picture display method in which the superimposed characters are provided by a character broadcasting system.

SUMMARY OF THE INVENTION

A television receiver according to one aspect of the present invention includes a controlling microcomputer 4, functioning as a character broadcasting signal decoder for decoding a character broadcasting signal, and a CRT 9 functioning as display means for displaying a picture based on a television signal superimposed on the character broadcasting signal. This television receiver further includes a video signal amplifier circuit 6 for changing the number of scanning lines used to display the picture on the CRT 9; and a data storage RAM 12 for moving a scanning line position where character information of the character broadcasting signal is displayed based upon the number of scanning lines for the picture, the number having been changed by the video signal amplifier circuit 6.

Either a key input unit 14, or a remote control unit 15 may be included as an instruction means for allowing a user to change the scanning line number of the picture with respect to the data storage RAM 12. The key input unit 14, or the remote control unit 15 may also be used to instruct that the character information is or is not to be displayed on the CRT 9.

According to another aspect of the present invention, a character information display method for a television receiver includes a step for designating a display mode; a step for instructing the display of character information by the character broadcasting signal; and, a step for setting the display position of the character information instructed by the display instructing step based on the display mode designated by the mode-designating step.

The television receiver of the present invention preferably includes a controlling microcomputer 4 functioning as a character broadcasting signal decoder for decoding a character broadcasting signal, and a CRT 9 functioning as a display for displaying a picture based on a television signal superimposed on the character broadcasting signal.

In this television receiver, the scanning line number for the picture displayed on the CRT 9 is varied in the video signal amplifier circuit 6, and based upon this varied scanning line number, the scanning line position is moved by the data storage RAM 12 in such a manner that the character information of the character broadcasting signal is displayed within the display region of the CRT 9. Therefore, the superimposed character information of the character broadcasting system can be accepted without being adversely influenced by the particular picture display method.

Furthermore, in the character information display method of the television receiver, based upon the display mode designated at the step S1, the display position of the character information designated at the step S3 is set at the step S4, so that the scanning line position where the character information is displayed is moved. As a consequence, it is possible to accept the superimposed word service supplied by the character broadcasting system without being adversely influenced by the picture display method used to supply the superimposed word service.

As previously described, in accordance with the television receiver of the present invention, the scanning fine number of the picture to be displayed on the display means is changed by the video signal amplifier circuit 6. Then, based upon the changed number of scanning lines, the scanning line position where the character information is displayed by the character broadcasting signal is moved in such a way that the character information given by the character broadcasting signal is displayed within the display region of the display means. As a consequence, it is possible to accept the superimposed word service supplied by the character broadcasting system without adverse influence by the picture display method used to supply the superimposed word service.

As previously described, in accordance with the television receiver of the character information display method of the present invention, based on the display mode designated at the mode designating step, the display position of the character information is set at the display position setting step. Then, the scanning line position where the character position is displayed is moved. As a consequence, it is possible to accept the superimposed word service supplied by the character broadcasting system without being adversely influenced by the picture display method used to supply the superimposed word service.

DETAILED DESCRIPTION OF THE PREFERRED EMBODIMENTS

Figure 1:
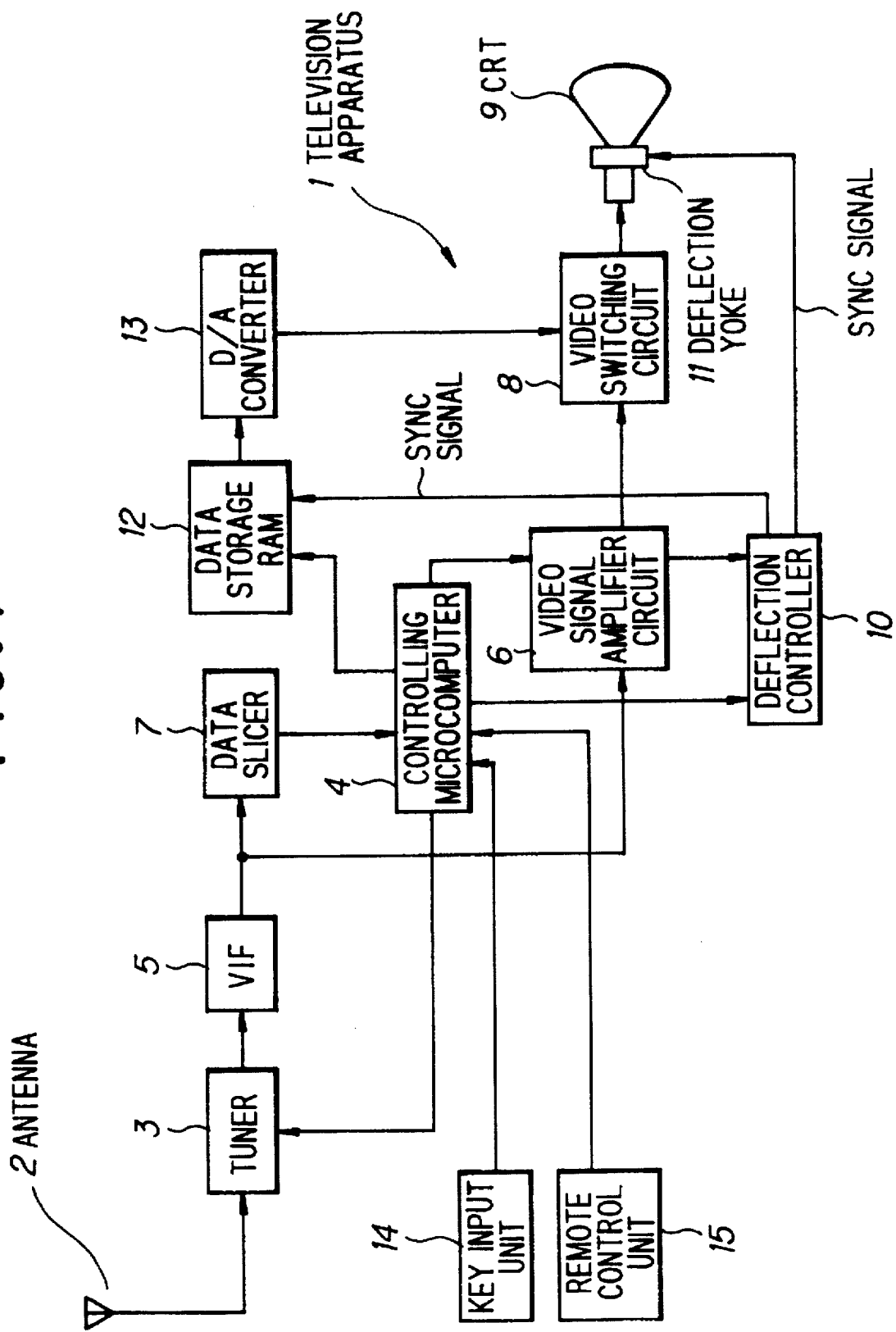
FIG. 1 is a schematic block diagram for representing an arrangement of a television receiver according to an embodiment of the present invention.

Referring now to the drawings, an embodiment of the present invention will be described.

Figure 2A:
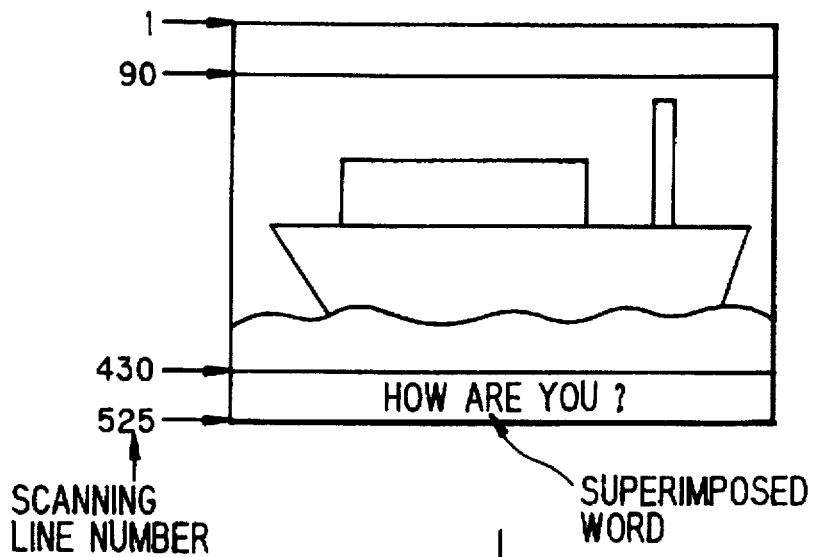
FIG. 2 is an explanatory diagram for explaining operations of the television receiver shown in FIG. 1.
Figure 2B:
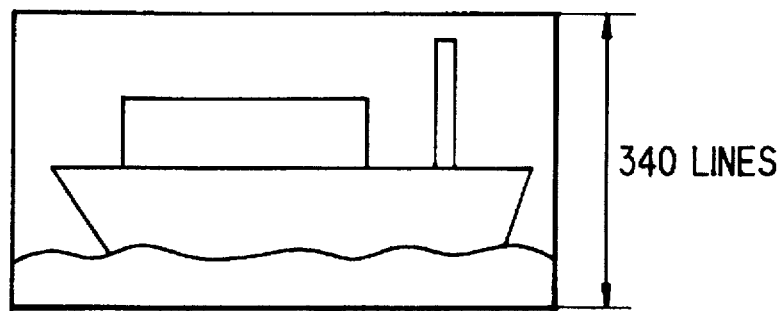
Figure 2C:
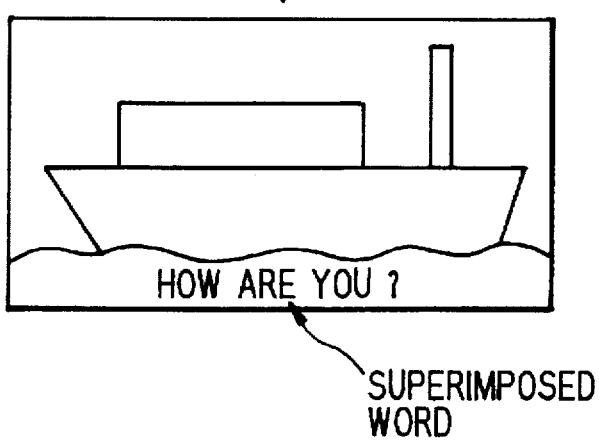
Figure 3:
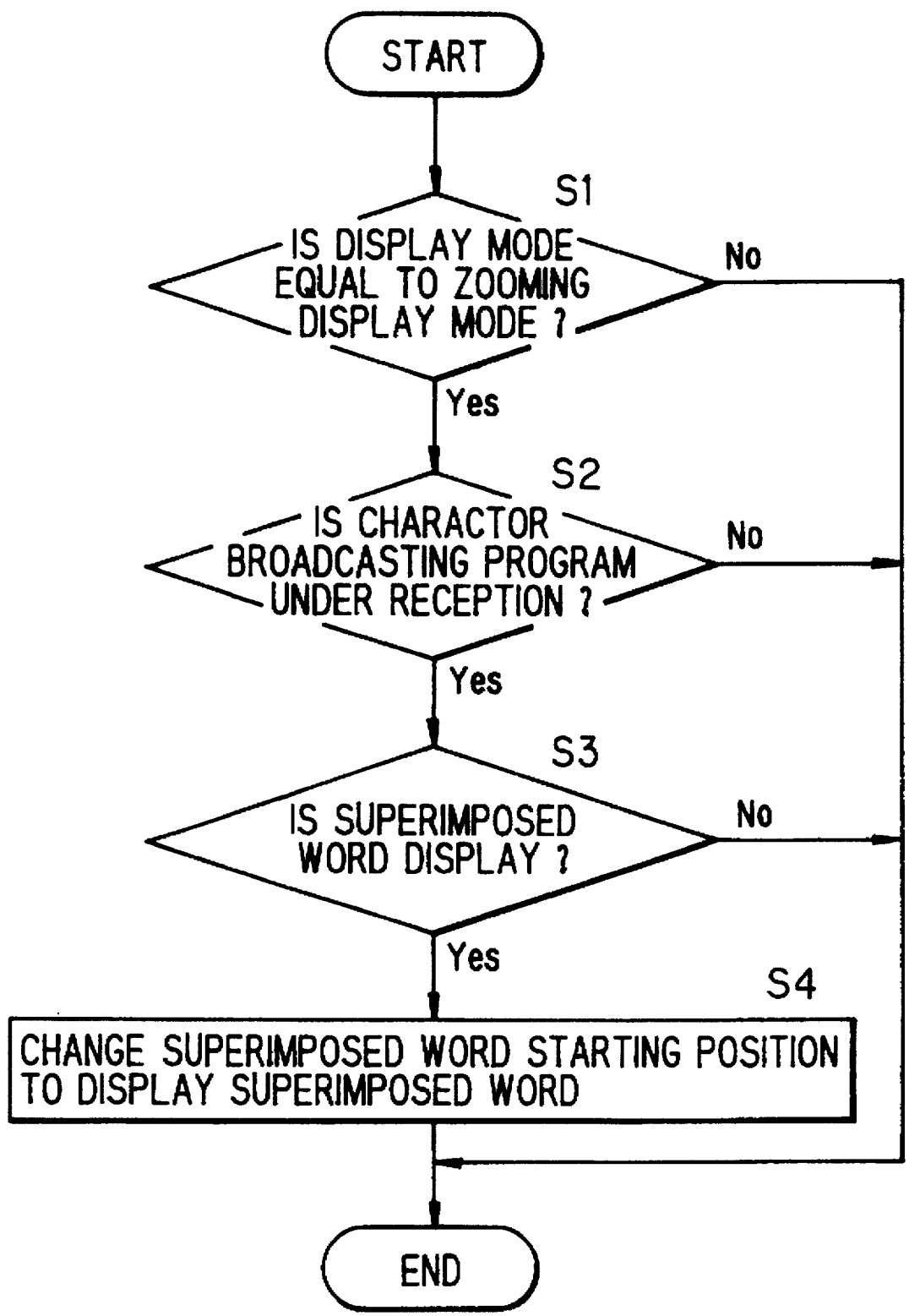
FIG. 3 is a flow chart for describing a flow operation of a zooming display mode executed by a controlling microcomputer 4 employed in the television receiver of FIG. 1; and, FIG. 4 is an explanatory diagram for explaining a video display region of a television receiver.
Figure 4A:
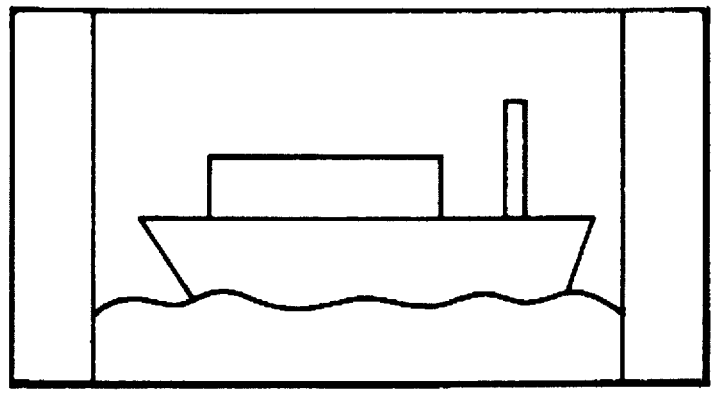
Figure 4B:
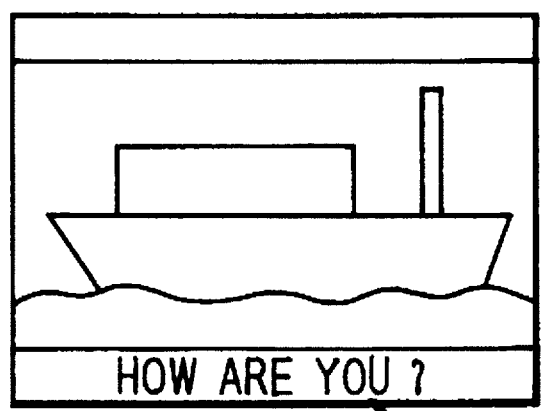

FIG. 1 through 3 are related to an embodiment of the present invention. FIG. 1 is a schematic block diagram for indicating a television receiver according to an embodiment of the present invention. FIG. 2 is an explanation diagram for explaining operations of the television receiver shown in FIG. 1. FIG. 3 is a flow chart for explaining the operation of the zooming display mode performed under control of the controlling microcomputer 4 of the receiver shown in FIG. 1.

It should be noted that the television receiver according to this embodiment is a high definition television signal receiver containing a character broadcasting (so-called "teletext" system) decoder. Since this high definition television signal receiver is capable of receiving/displaying the conventional standard television signal (for instance, NTSC TV signal), and this signal convention method is known in the art, explanations are omitted herein. Additionally, since the protocol of the character signal used in the character broadcasting system corresponds to the hierarchical structure model according to the ISO DIS 7498 Open System Interconnection—Basic Reference Model defined by ISO, the explanation is also omitted in the following description. It will, of course, be appreciated that the present invention is not so limited, but, in fact, may include standard television receivers.

As shown in FIG. 1, in the television receiver 1 of this embodiment, the television broadcasting signal is received by an antenna 2 and then is tuned by a tuner 3. This tuner 3 is tuned to a specific frequency of the television broadcasting signal by a controlling microcomputer 4.

The TV signal tuned by the tuner 3, is detected as a video (picture) signal by a video intermediate frequency signal processing/detecting circuit (will be referred to a "VIF" hereinafter) 5, and this video signal detected by the VIF 5 is outputted to a video signal amplifier circuit 6 and also to a data slicer 7. The data slicer 7 detects character information which has been superimposed on a line determined by a specific horizontal sync (synchronization) signal within the vertical flyback period.

The video signal is amplified and the color signal process is carried out in the video signal amplifier circuit 6, and thereafter the resulting signal is outputted as R, G, B signals to a video switching circuit 8. Then, these R, G, B signals are supplied from the video signal amplifier circuit 6 via this video switching circuit 8 to a CRT (cathode-ray tube) 9 having an aspect ratio of 16:9. The video signal amplifier circuit 6 extracts the sync signal from the video signal and then outputs this extracted sync signal to a deflection controller 10. In response to horizontal and vertical sync signals produced based upon the extracted sync signal, a deflection yoke 11 of the CRT 9 is driven to display a TV pictured on this CRT 9 under control of the deflection controller 10.

On the other hand, in the data slicer 7, the character information superimposed on the TV signal is detected as a digital signal, and then the detected character information is outputted to the controlling microcomputer 4. The controlling microcomputer 4 decodes the character broadcasting signal, and the character information detected by the data slicer 7 is stored in a buffer memory (not shown in detail) employed within the controlling microcomputer 4. Then, the controlling microcomputer 4 judges whether or not the stored character information corresponds to the character information of the required channel information. This character information judgement is performed based upon the channel information designated by a user, given from either a key input unit 14, or a remote control unit 15, which may be directly or remotely connected to the television receiver 1, respectively.

When it is so judged that the stored character information corresponds to the character information of the required program information, the controlling microcomputer 4 produces a character signal by way of a pattern memory and a color memory (not shown) and stores this character signal into a data storage RAM 12. The character signal is then read out from the data storage RAM 12 in response to the sync signal issued from the deflection controller 10, is supplied through a D/A converter 13 to the video switching circuit 8, and thereafter is outputted the R, G, B signals via the video switching circuit 8 to the CRT 9.

As previously described, since the aspect ratio of the CRT 9 is selected to be 16:9, the television receiver 1 according to this embodiment is capable of receiving the TV signal not only in the normal display mode, but also in the zooming display mode. That is, for instance, when a longer lateral-sized picture such as a movie picture is received in the NTSC system by this television receiver 1, the user instructs through either the key input unit 14, or the remote control unit 15 to widen the interval between the successive scanning lines along the upper and lower (vertical) direction, so that this longer lateral-sized picture can be displayed on the entire screen of the CRT 9. This display mode selection is performed by the video signal amplifier circuit 6 under control of the controlling microcomputer 4.

It should be noted that since the detailed function of the character broadcasting decoder of the controlling microcomputer 4 is described in, for instance, the publication 1 ("Guide to Character Broadcasting Signal Reception" by NHK, Jan. 15, 1986), i.e., is well known in this field, no further description is herein made.

In the television receiver 1 with the above-described circuit arrangement, for example, when such a movie picture having blank portions in the upper and lower sides of the screen is received in the NTSC system, (as illustrated in FIG. 2), this movie picture is displayed on the screen generally between the scanning line numbers 90 and 430. The character information is displayed on the screen between the scanning line numbers 431 and 525 under control of the controlling microcomputer 4. Since the aspect radio of the CRT 9 is selected to be 16:9, the zooming display mode is available to the user through the key input unit 14 or the remote control unit 15 in the television receiver 1. In this case, when the interval between the continuous scanning lines is simply widened along the upper and lower directions to display this movie picture on the overall screen of the CRT 9, as illustrated in FIG. 2b, the superimposed words, e.g., "how are you?" corresponding to the character information, would be dropped out from the display screen. However, in accordance with the television receiver 1 of this embodiment, a dropout of the character information may be prevented.

As shown in the flow chart of FIG. 3, the controlling microcomputer 4 judges at a step S1 whether or not the present display mode is equal to the zooming display mode. If it is judged that the zooming display mode is not selected, the picture is displayed on the CRT 9 in the normal display mode. On the contrary, in the case where the zooming display mode is selected, the controlling microcomputer 4 controls the video signal amplifier circuit 6 to produce a video (picture) signal in the zooming display mode and operation is advanced to a step S2. At this step S2, judgment is made as to whether or not a character broadcasting signal is being received. If a character broadcasting signal is not being received, this operation is completed, and then the picture is displayed in the zooming display mode. On the contrary, when a character broadcasting TV signal is being received, operation is advanced to a further step S3.

At step S3, judgment is made as to whether or not the user selects to display the superimposed word corresponding to the character information. This may be accomplished via operation of either the key input unit 14, or the remote control unit 15. If the display of the superimposed word is not selected, operation is completed, and the picture is displayed without the superimposed word in the zooming display mode. If the display of the superimposed word is selected, operation is advanced to a step. S4.

At this step S4, the data storage RAM is controlled so as to move up the starting position to display the superimposed word to a display position defined by, for instance, approximately 100 scanning lines higher. At that point, operation is completed.

As a result, as shown in FIG. 2c, the superimposed word which has been displayed from, for example, the position defined by the 450th scanning line is newly displayed from another position defined by the 350th scanning line. Thus, this superimposed word may be moved within the display screen.

It should be understood that the changed scanning line number and also the number of scanning lines for the starting position to display the superimposed word are not limited to the above-described specifications. Additionally the superimposed word may be continuously displayed on the CRT 9.

As previously explained, in accordance with the television receiver of this embodiment, in a character broadcasting system including superimposed character information, even when the picture is displayed in an enlarged manner, it is possible to prevent the character information from being dropped out. Accordingly, the superimposed word service provided by the character broadcasting program can be received without any difficulties.

Since the television receiver 1 according to this embodiment is a high definition television signal receiver, in the zoom display mode, high definition television signals as well as standard television signals can be received. Also the superimposed word service provided by the character broadcasting program superimposed on the high definition television signals can be received without any problems.

It should also be noted that while explanation of the present invention has been limited to that of a high definition television receiver, the present invention is not so limited, but may in fact be used with a standard television signal receiver.

What is claimed is:

1. A television receiver for displaying character information contained in a video signal, comprising:
   a character information detector means for detecting said character information in said video signal and for providing a character broadcasting signal;
   a character broadcasting signal decoder means for decoding said character broadcasting signal;
   a display for displaying a picture in response to a television signal received by said television receiver on which said character information has been superimposed;
   scanning-line-number changing means for changing the number of scanning lines used to display said picture on said display means; and,
   scanning-line-position moving means for moving a scanning line position where said character information is to be displayed through a range of permissible locations, based upon the number of said scanning lines changed by said scanning-line-number changing means.

2. The television receiver of claim 1, further comprising:
   instruction means for instructing said scanning-line-number changing means to change the scanning line number of said picture.

3. The television of claim 2, wherein:
   said instruction means instructs said display to display said character information.

4. The television of claim 1, wherein:
   said character information is superimposed on a vertical sync signal of said video signal.

5. The television receiver of claim 1, wherein:
   said display has a first aspect ratio which is selected to be M:N, and wherein said video signal having a second aspect ratio of m:n is changed into said first aspect ratio of M:N in accordance with said change in said scanning line number by said scanning-line-number changing means, wherein N/M>n/m.

6. The television receiver of claim 5, wherein:
   said first aspect ratio M:N is 4:3 and said second aspect ratio of m:n is 16:9.

7. A character information display method for a television receiver comprising a character broadcasting decoder for decoding a character broadcasting signal; and a display for displaying a picture based upon a television signal on which said character broadcasting signal has been superimposed in a plurality of incremental display modes, said display method comprising the steps of:
   designating said incremental display mode via a user input;
   instructing said character information of said character broadcasting signal to be displayed; and,
   setting a display position of said character information instructed by said display instructing step based on said incremental display mode designated in said mode designating step.

8. A television receiver for displaying character information superimposed on a television signal, comprising:
   character information decoder means for detecting said character information;
   a display for displaying a picture in response to said television signal, said picture including said superimposed character information;
   a scanning-line-number changing unit for changing the number of scanning lines used to display said picture on said display;
   a scanning-line-position moving unit for moving a scanning line position through a user selectable range of positions where said character information is to be displayed, wherein said scanning line position is determined according to the number of scanning lines changed by said scanning-line-number changing unit.

9. The television receiver of claim 8, further comprising:
   an instruction unit means for instructing said scanning-line-number changing unit to change the number of scanned lines.

10. The television receiver of claim 8, wherein said character information decoder means comprises:
    character information detector means for detecting said character information superimposed on said television signal and for providing a character broadcasting signal; and,
    character broadcasting decoder means for decoding said character broadcasting signal.

11. The television receiver of claim 10, wherein said character information detector means comprises a data slicer.

12. The television receiver of claim 10, wherein said character broadcasting decoder means comprises a microcomputer.

13. The television receiver of claim 8, wherein said scanning-line-number changing unit comprises a video signal amplifier.

14. The television receiver of claim 8, wherein said scanning-line-position moving unit comprises a data storage RAM.

15. The television receiver of claim 9, wherein said instruction unit comprises a key input unit connected to said character information decoder means.

16. The television receiver of claim 9, wherein said instruction unit comprises a remote controller, said remote controller communicating with said character information decoder means.

17. A television receiver adapted to display character information superimposed on a television signal in multiple user selectable formats, comprising:
    a data slicer for detecting said superimposed character information and for providing a character broadcasting signal;
    a microcomputer for decoding said character broadcasting signal;
    a display for displaying a picture in response to said television signal, said picture including said superimposed character information;
    a user input device for selecting among a range of numbers of scanning lines used to display said picture on said display;
    a video signal amplifier for changing the number of scanning lines used to display said picture on said display; and,
    a data storage RAM for moving a scanning line position where said character information is to be displayed, wherein said scanning line position is determined according to the number of scanning lines changed by said video signal amplifier.

18. A method of displaying character information superimposed on a television signal received in a television receiver, wherein said character information is superimposed on said television signal in a plurality of display modes including a zooming display mode, and wherein said television receiver includes a character information detector for detecting said character information and for providing a character broadcasting signal, a character broadcasting decoder for decoding said character broadcasting signal, a scanning-line-position moving unit and a display for displaying a picture based upon said television signal, the method comprising the steps of:

selecting one of said plurality of said display modes;

determining whether character information has been detected by said character information detector when said zooming display mode has been selected; and, controlling said scanning-line position moving unit to move a scanning line position where said character information is to be displayed, when said character information detector detects said character information.

19. The method of claim 18, wherein said television receiver further comprises a scanning-line-number changing unit for changing the number of scanning lines used to display said picture on said display, and wherein said display mode selecting step further comprises the steps of:

sending an instruction to said character broadcasting decoder to change the number of scanning lines used to display said picture on said display through instruction means; and, controlling said scanning-line-number changing unit through said character broadcasting decoder to change the number of said scanning lines.

20. The method of claim 19, wherein said instruction means comprises a key input unit connected to said character broadcasting decoder.

21. The method of claim 18, wherein said instruction means comprises a remote controller, said remote controller communicating with said character information decoder.

22. The method of claim 18, wherein said television receiver further includes instruction means for selecting one of said plurality of display modes, further comprising the step of:

controlling whether said character information is displayed on said display through said instruction means when said character information detector detects said character information.

23. The method of claim 18, wherein said character broadcasting decoder includes a memory, and wherein said character information determining step further comprises the steps of:

selecting a television channel, said television channel including channel information;

storing said character information in said memory;

determining through said character broadcasting decoder whether said character information stored in said memory corresponds to said channel information of said selected television channel;

producing a character signal from said character broadcasting decoder when said character information stored in said memory corresponds to said channel information of said selected television channel; and, storing said character signal in said scanning-line-position moving unit.

* * * * *